United States Patent [19]
Kessler et al.

[11] Patent Number: 6,068,908
[45] Date of Patent: May 30, 2000

[54] FLOOR MAT SYSTEM

[75] Inventors: Ronald N. Kessler, Girard; Myron E. Ullman, Canfield, both of Ohio

[73] Assignee: R & L Marketing & Sales, Inc., Boardman, Ohio

[21] Appl. No.: 09/199,107

[22] Filed: Nov. 24, 1998

Related U.S. Application Data

[63] Continuation of application No. 08/823,377, Mar. 24, 1997, Pat. No. 5,882,764.
[51] Int. Cl.[7] .................................................. B32B 3/10
[52] U.S. Cl. ............................ 428/100; 428/99; 52/177
[58] Field of Search ..................... 428/99, 100; 52/177, 52/180; 15/215, 238, 241

[56] References Cited

U.S. PATENT DOCUMENTS 4,798,029   1/1989   Carlton ........................................ 52/177

*Primary Examiner*—Alexander Thomas
*Attorney, Agent, or Firm*—Sand & Sebolt

[57] ABSTRACT

A floor mat system and clip for use therewith can be installed to any floor and includes a floor mat formed from a series of first and second cris-crossed ribs which form rectangular-shaped openings therebetween, and clip having a rectangular-shape base and four outwardly extending raised projections. Certain of the second ribs have an enlarged bottom which forms a latching shoulder on each side thereof. The projections of the clip have a generally triangular-shaped end which snap-fits with the latching shoulder of the certain second ribs and which aligns with certain of the openings of the floor mat. A pair of holes are formed in the clip which align with other of the openings of the floor mat when attached thereto.

7 Claims, 5 Drawing Sheets

FLOOR MAT SYSTEM

CROSS REFERENCE TO RELATED APPLICATIONS

This application is a continuation application of currently U.S. patent application Ser. No. 08/823,377 filed Mar. 24, 1997, U.S. Pat. No. 5,882,764 the disclosures of which are incorporated herein by reference.

BACKGROUND OF THE INVENTION

1. Technical Field

Generally, the invention relates to a floor mat system and clip for use therewith. Particularly, the invention relates to a floor mat system which includes a clip which mounts on the floor and engages the floor mat to retain the floor mat on the floor. Specifically, the invention relates to a floor mat formed with a latching shoulder, and a clip which is secured to the floor and which is formed with a plurality of latching projections which engage the latching shoulder to retain the floor mat adjacent the floor.

2. Background Information

Floor mats are often used at the entrances of businesses for customers to wipe water and snow from the bottoms of their shoes. Conventional floor mats are constructed of a flexible rubber and are formed with a plurality of spaced apart orthogonal ribs which form rectangular-shaped openings. These conventional floor mats require that a recessed area be formed in the floor where the floor mats are located with the edges of the recessed area preventing the floor mats from sliding when walked upon by a customer. The water and snow from the customer's shoes flows through the openings keeping the top surface of the floor mat free of standing water.

Although these prior art floor mats are adequate for the purpose for which they were intended, the business owner must plan for the installation of these floor mats and have the recessed area built into the floor during construction of the building. If these prior art floor mats are merely placed on the floor without a recessed area the floor mats slide when a horizontal pressure from a customers shoes or from strong wind is applied on the mats. Alternatively, the recessed area can be dug out of the floor after the building has been constructed at a great expense to the business owner. Additionally, even when a recessed area has been provided to accept the floor mat, if large mats are utilized, or a number of mats are utilized adjacent one another, the mats may still move within the recessed area possibly causing an unsafe condition.

Therefore, the need exists for an improved floor mat system and clip for use therewith which can be easily retrofit onto any floor without modification to the floor, in which the floor mat includes a plurality of openings to allow water and snow to flow therethrough keeping a top surface of the floor mat free from standing water, which is easily removable to allow the water under the mat to be cleaned up and which easily snap-fits back onto the clips after clean-up.

SUMMARY OF THE INVENTION

Objectives of the invention include providing a floor mat system and clip for use therewith which is easily installed to any floor without substantial modification to the floor.

Another objective is to provide such a floor mat system and clip in which the floor mat is constructed of a flexible durable material which will withstand inclement weather.

A further objective is to provide such a system and clip in which the floor mat can be easily removed from the clips to allow clean-up of any dirt, debris or water under the mat and which is easily snap-fit back onto the clips after clean-up.

Still another objective is to provide such a system and clip which can be installed into existing recessed areas to replace old mats.

A still further objective of the invention is to provide such a floor mat system which is of simple construction, which achieves the stated objectives in a simple, effective and inexpensive manner and which solves problems and satisfies needs existing in the art.

These objectives and advantages are obtained by the improved floor mat system of the present invention, the general nature of which may be stated as including a floor mat system adapted to lie on the floor, comprising a floor mat having a plurality of openings and at least one latching shoulder; a clip adapted to be removably mounted on the floor; the floor mat removably secured to the clip in a manner that allows the floor mat to be removed from the clip simply by lifting the floor mat upwardly causing the floor mat to disengage the clip when the clip is secured to the floor.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
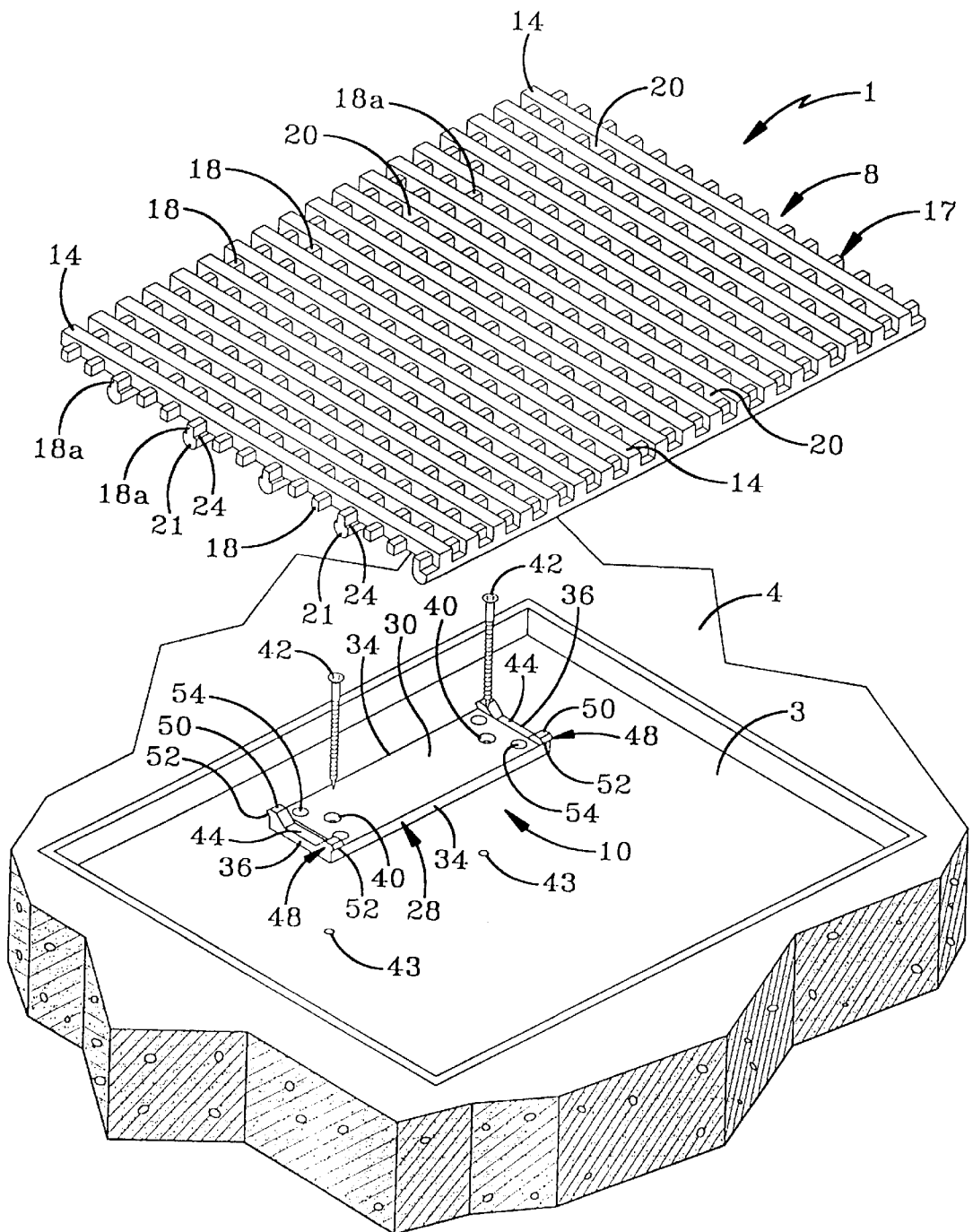
FIG. 1 is an exploded fragmentary perspective view of the floor mat system and clip for use therewith prior to being installed into a recessed area formed in a floor.
Figure 2:
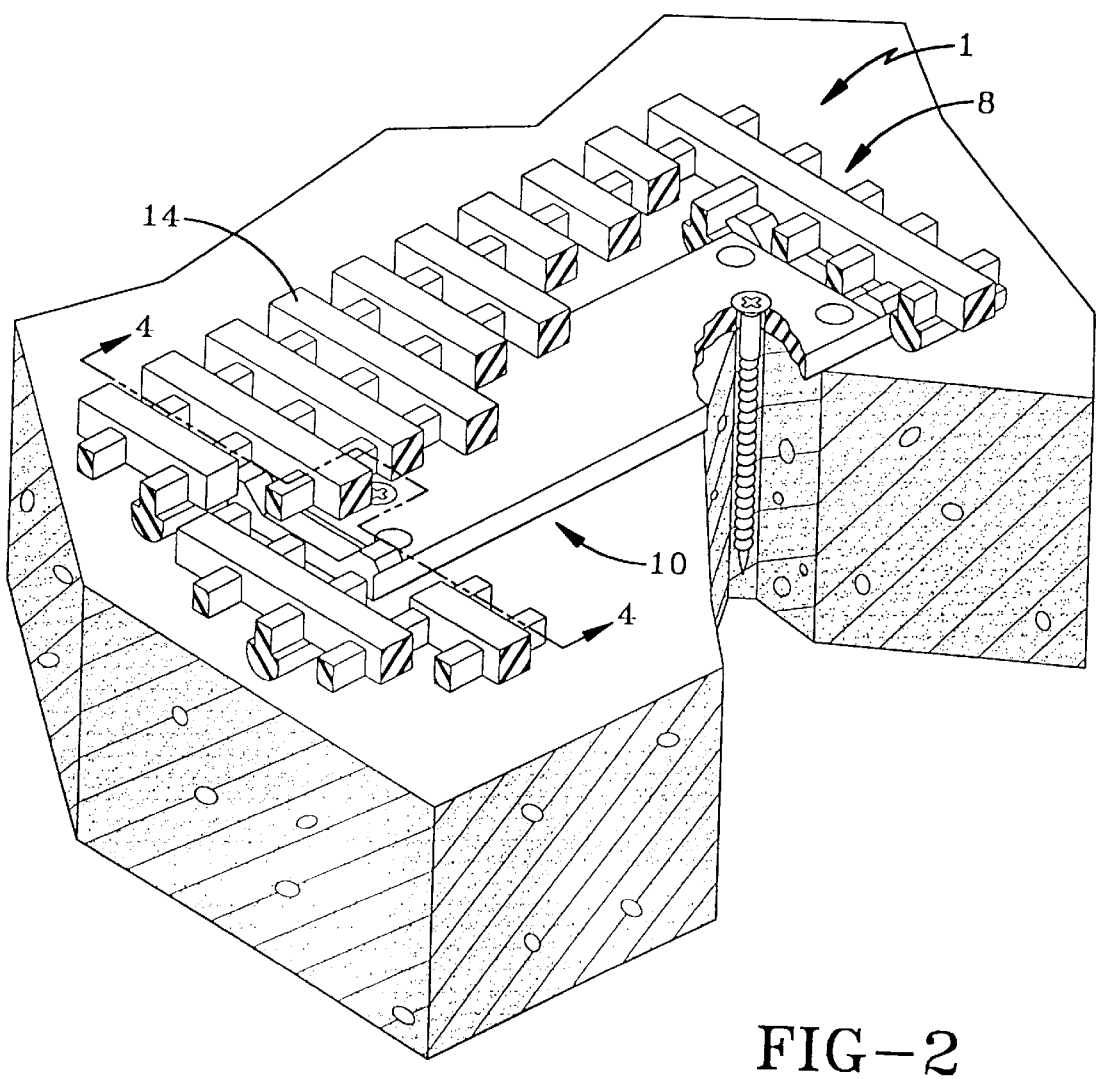
FIG. 2 is an enlarged fragmentary perspective view of the system and clip of FIG. 1 showing the clip secured to the floor and showing the floor mat snap-fit with the clip.
Figure 3:
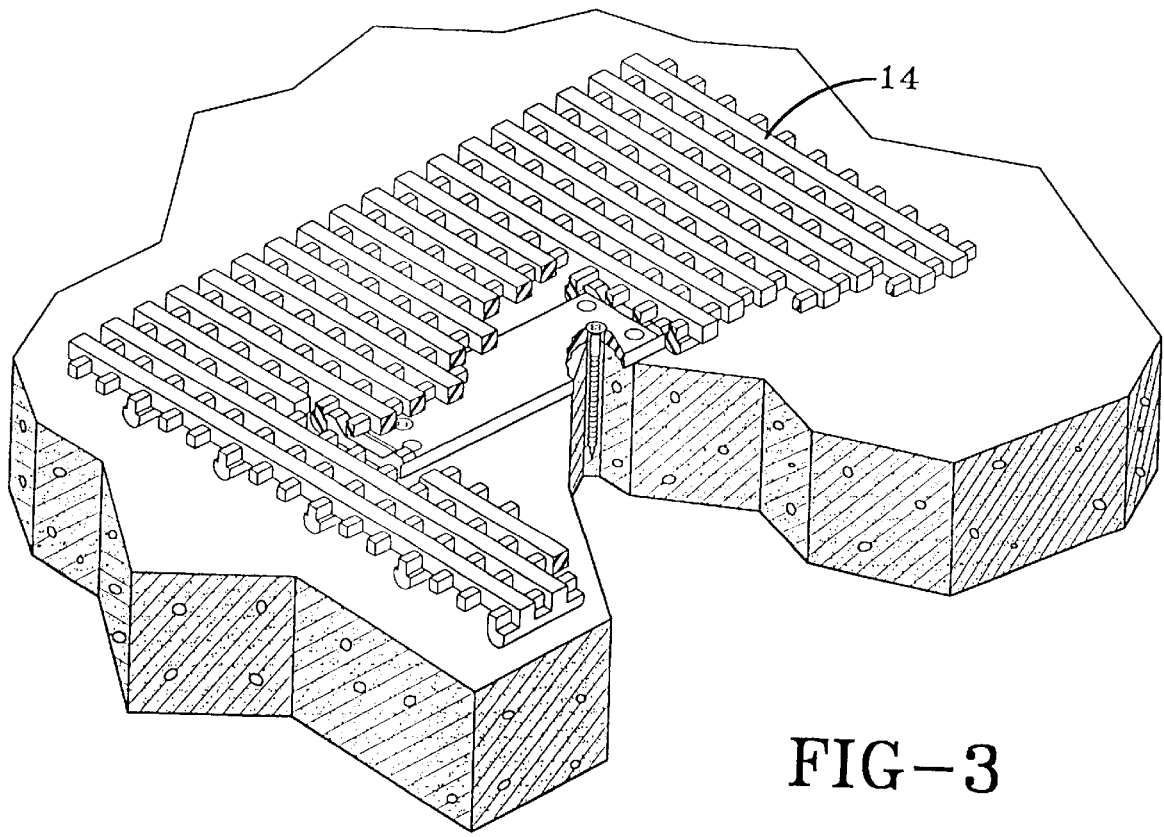
FIG. 3 is a reduced fragmentary perspective view similar to FIG. 2.

The floor mat system of the present invention is shown in FIG. 1 and is indicated generally at 1. System 1 is shown in FIG. 1 exploded from within a recessed area 3 formed in a floor 4. However, system 1 can be mounted directly on a floor 4 free of recessed area 3 without departing from the spirit of the present invention (FIGS. 2 and 3). Floor 4 may be constructed of various materials, such as wood or blacktop, and is shown in FIGS. 1–4 constructed of cement.

Figure 5:
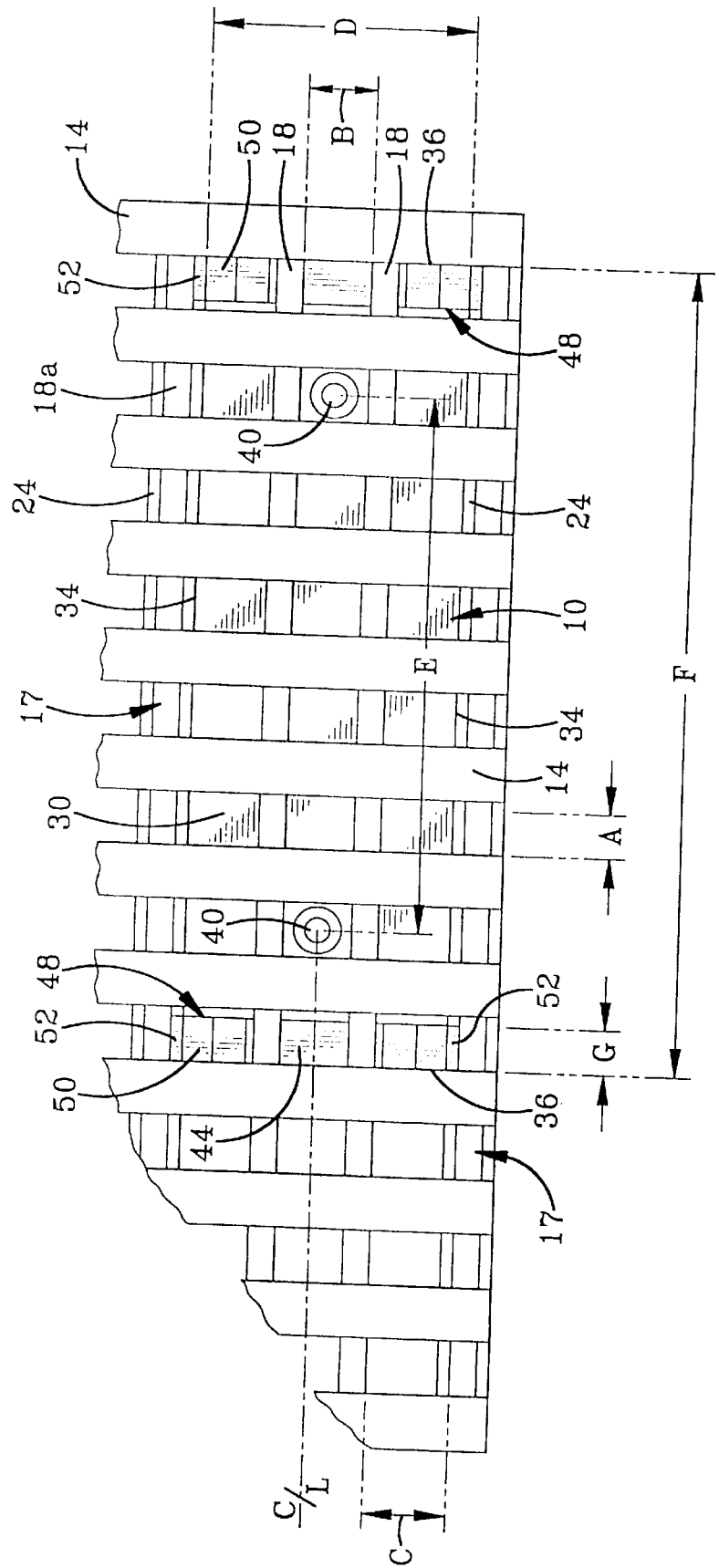
FIG. 5 is a fragmentary top plan view showing the alignment of the holes of the clip with certain of the openings of the floor mat when the clip is snap-fit thereto.

System 1 includes a floor mat, indicated generally at 8, and a clip, indicated generally at 10 (FIG. 1). Floor mat 8 includes a series of first parallel rectangular-shaped ribs 14 which are spaced apart from one another by a distance A (FIG. 5) substantially equal to their width, or approximately ¼ inches. A series of second spaced parallel rectangular-shaped ribs 17 extend perpendicular to and between first ribs 14 forming rectangular openings 20 therebetween.

In accordance with one of the features of the invention, second ribs 17 consist of a pair of middle ribs 18 which extend between a pair of latching ribs 18a. Middle ribs 18 are approximately ⅛ inches wide and are separated from one another by a distance B (FIGS. 1–5) which is approximately 5/16 inches. Latching ribs 18a have an enlarged bottom 21 which forms an upwardly facing latching shoulder 24 on each side of latching ribs 18a. Latching ribs 18a are spaced apart from adjacent middle ribs 18 by a distance C (FIGS. 1–5) approximately ⅜ inches. Additionally, second ribs 17 are slightly shorter than first ribs 14 thereby creating a sculptured top surface of floor mat 8. Additionally, enlarged bottom 21 extends substantially below the bottom surface of first ribs 14 and of middle ribs 18 thereby suspending the majority of floor mat 8 above floor 4 thereby creating drainage channels for water and debris scraped from customer's shoes.

Clip 10 includes a rectangular-shaped base 28 (FIG. 1) having top and bottom surfaces 30 and 32 (FIG. 4), respectively, sides 34 and ends 36. A pair of countersunk circular holes 40 are formed in base 28. Each countersunk hole 40 receives a screw 42 therethrough which secures clip 10 to floor 4 and which further extends within a hole 43 formed in floor 4 when system 1 is installed within recessed area 3 (FIG. 1) or directly on floor 4 (FIG. 3). A small cut-out area 44 (FIG. 1) is formed adjacent each end 36 of base 28 to assist in snap-fitting floor mat 8 to clip 10 as described below.

In accordance with another of the features of the invention, a pair of raised projections 48 extends outwardly from each side 34 adjacent each end 36. Projections 48 extend angularly upwardly from cut-out area 44 and include a flat top portion 50 and a generally triangular end 52 which extends beyond sides 34 and above top surface 30 of base 28.

In accordance with a further feature of the invention, base 28 of clip 10 has a width D measured between sides 34 substantially equal to the distance between enlarged bottoms 21 of ribs 18a, or within the broad range of ¾ to 1⅝ inches, within the specific range of 1 to 1⅜ inches and in the preferred embodiment is approximately 1³/16 inches. Clip 10 has a centerline C/L (FIG. 5) which aligns with the center of openings 20 formed between middle ribs 18. Holes 40 are formed in base 28 along centerline C/L and in the preferred embodiment are spaced apart by a distance E which is approximately 2½ inches wherein holes 40 are coaxial and align with certain of openings 20.

Base 28 has a length F measured between ends 36 which is substantially equal to the distance which separates certain of ribs 14 which in the preferred embodiment is approximately 4⅛ inches. Projections 48 have a width G which is slightly smaller than the distance which separates two adjacent ribs 14, or approximately 3/16 inches, and extend beyond sides 34 by approximately 1/16 inches.

An additional countersunk hole 54 (FIG. 1) is formed adjacent each projection 48 for receiving additional screws 42 in the event clip 10 requires further securing to floor 4. Holes 54 align with certain of first ribs 14 when clip 10 is secured to floor mat 8.

Figure 4:
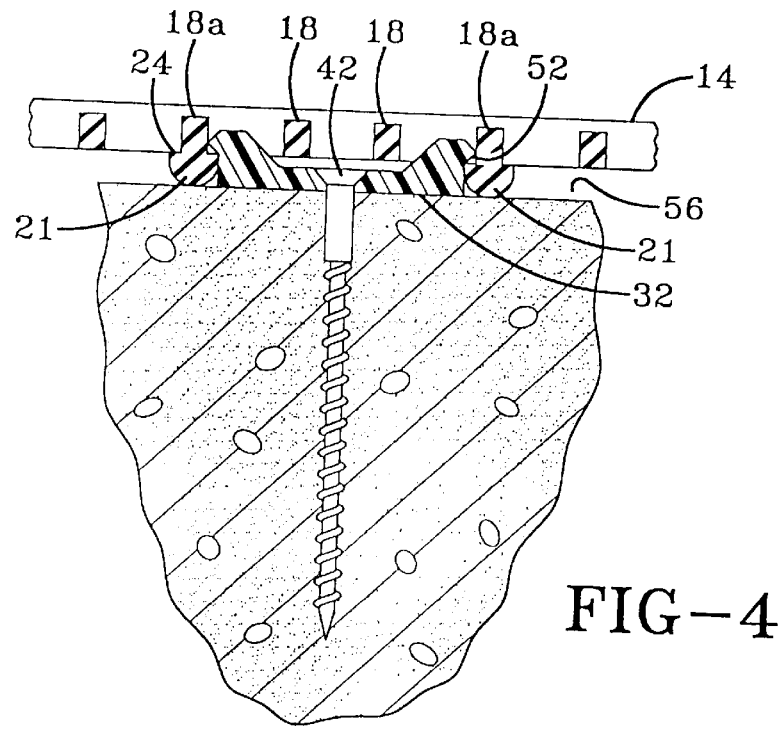
FIG. 4 is a sectional view taken along line 4—4, FIG. 2 with the mat cut away.

Floor mat system 1 of the present invention may be installed at the entrance of a business, for example, to prevent customers from tracking water or snow on the business' floors. When installing system 1, clip 10 snap-fits to floor mat 8 by placing clip 10 on the bottom surface of floor mat 8 between two latching ribs 18a (FIG. 4). Each projection 48 aligns with a certain of openings 20 formed between latching ribs 18a and the middle ribs 18 extending therebetween. When mat 8 is installed onto clip 10, clip 10 is angled to one side and projections 48 of the one side 34 are inserted into respective aligned openings 20. Projections 48 of the one side extend over latching shoulders 24 of enlarged bottom 21 of one latching rib 18a. Bottom surface 32 of the other side 34 of base 28 is pressed adjacent projections 48 toward the bottom surface of floor mat 8. The resilient material of floor mat 8 allows projections 48 of the other side to deflect enlarged bottom 21 and snap-fit over latching shoulder 24 of the other latching rib 18a. Latching shoulders 24 of latching ribs 18a thus retain clip 10 adjacent the bottom surface of floor mat 8.

A plurality of clips 10 are snap-fit to floor mat 8 as described above before floor mat system 1 is mounted on floor 4. Floor mat 8 with clips 10 snap-fit thereto is positioned within recessed area 3 of floor 4, or alternatively, is placed directly on floor 4. Enlarged bottoms 21 of latching ribs 18a contact floor 4 forming a gap 56 (FIG. 4) between floor 4 and the bottom surface of ribs 14 and 18.

Figure 7:
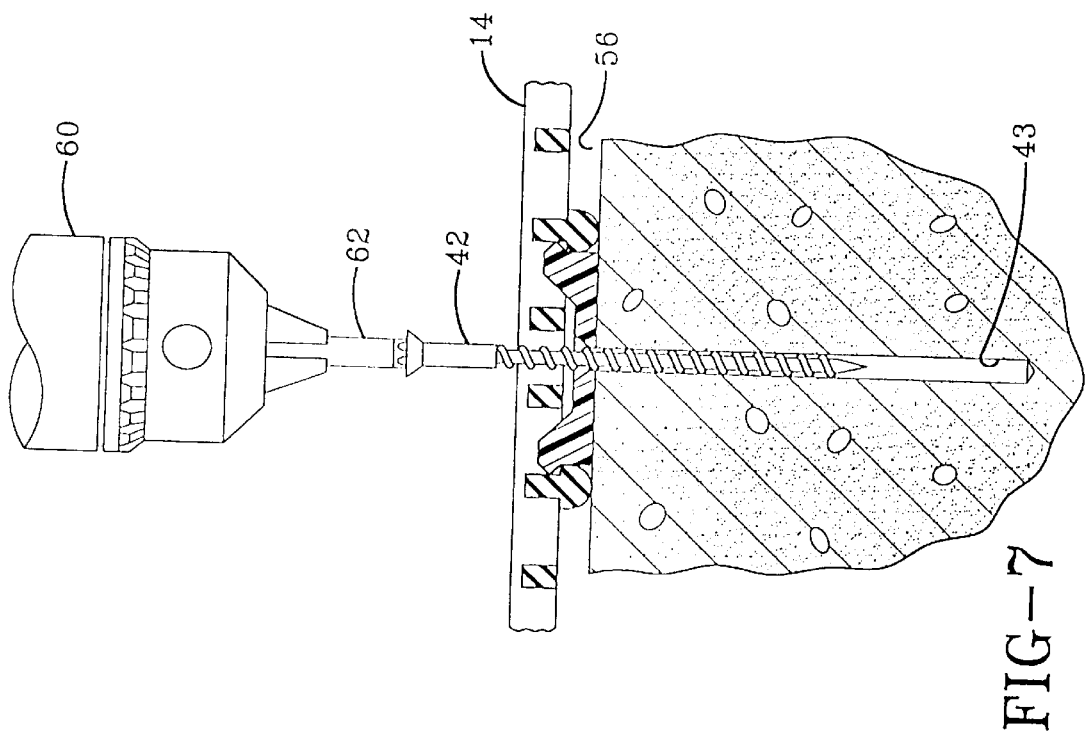
FIG. 7 is a fragmentary sectional view similar to FIG. 6 showing the clip being secured to the floor.
Figure 6:
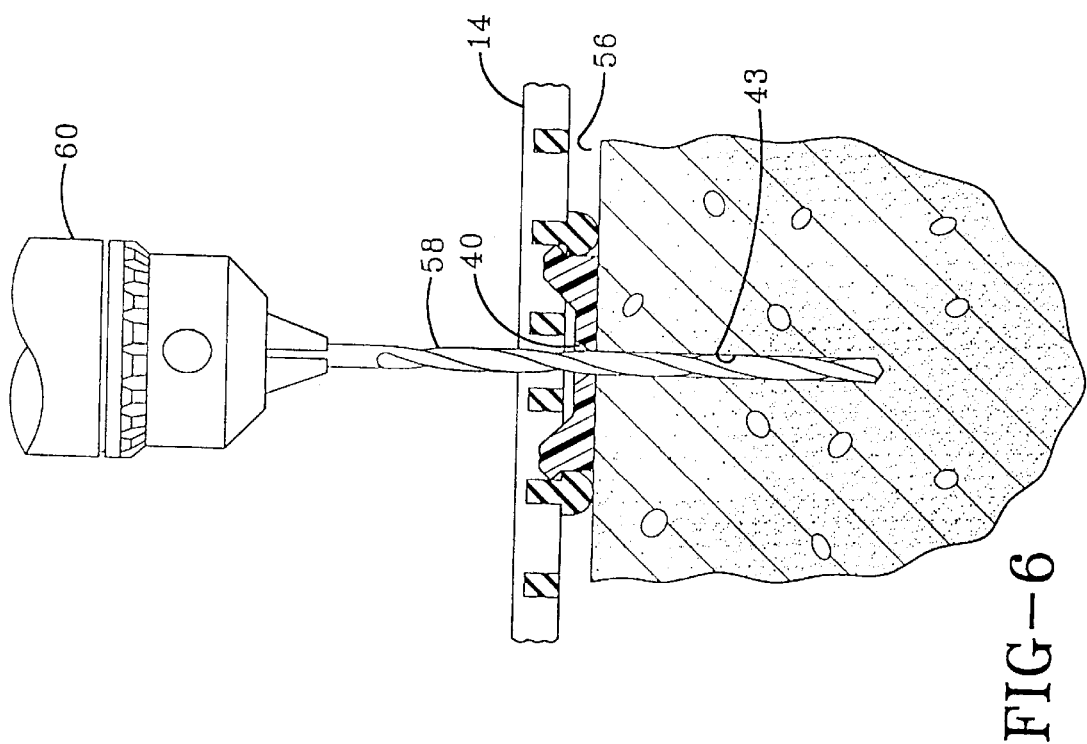
FIG. 6 is a sectional view similar to FIG. 4 showing the alignment of the holes of the clip with certain of the openings of the floor mat during the installation of the floor mat to the floor.

Holes 40 of base 28 align with certain of openings 20 and a drill bit 58 (FIG. 6) of a drill 60 is inserted into openings 20 and the aligned holes 40 to drill holes 43 in floor 4. Screws 42 are then inserted through openings 20 and holes 40 and are tightened with a screwdriver bit 62 (FIG. 7) of drill 60 into holes 43 to secure clips 10 to floor 4 (FIG. 4).

Floor mat 8 may be walked upon by the customers of the business and clips 10 secure floor mat 8 in place to prevent sliding movement thereof. Water from the customer's shoes flows through openings 20 and settles within gap 56 between floor mat 8 and floor 4. If floor mat system 1 is installed within recessed area 3 (FIG. 1) or on a floor 4 which is relatively flat, floor mat 8 must be removed from clips 10 to clean-up any dirt, debris or standing water which may accumulate in gap 56. Additionally, if floor mat system 1 is installed within recessed area 3, a drain may be provided to remove standing water such that the floor mat 8 maybe removed less often, and only for the purpose of removing accumulated debris.

Floor mat 8 is removed by lifting and bowing floor mat 8 upwardly at the edge thereof parallel to second ribs 17. The bowing and resiliency of floor mat 8 causes projections 48 to pop out of engagement with latching shoulder 24 of latching ribs 18a allowing floor mat 8 to be lifted out of recessed area 3 or from its position on floor 4.

After the dirt, debris or water is cleaned-up, floor mat 8 is returned to its original position on floor 4 wherein the certain of openings 20 align with projections 48. Floor mat 8 is pressed downward directly above each cutout area 44 causing floor mat 8 to bow slightly upwardly above clip 10. The bowing and the resiliency of the material of floor mat 8 allows projections 48 to snap back into engagement with latching shoulders 24 of latching ribs 18a re-securing floor mat 8 to floor 4.

Any number of clips 10 can be snap-fit to floor mat 8 and holes 40 align with openings 20 regardless of where the clips are positioned on the floor mat. Holes 54 of clips 10 may be used with additional screws 42 to further secure clips 10 to floor 4. Holes 54 align with first ribs 14 requiring that the floor mat be removed from the clips as described above, to allow access to holes 54 for drilling of holes in floor 4 and insertion of the screws therein. Screws 42 may be of any type suitable for use with floor 4 and are shown in FIGS. 2–4 as cement screws for use in cement floor 4. Also, floor mat 8 may be manufactured to any size necessary to cover the floor in front of the business' entrance or to a size complementary to that of a recessed area 3 formed in floor 4.

Additionally, it is noted that mat material may be manufactured of any resilient material such as rubber or plastic without departing from the spirit of the present invention.

Accordingly, the floor mat system 1 of the present invention is easily installed by snap-fitting a plurality of clips 10 to the bottom of floor mat 8 prior to installing floor mat system 1. Further, the alignment of holes 40 with openings 20 eliminates the time consuming task of measuring precisely where clips 10 must be mounted on floor 4 to assure projections 48 of clips 10 align with openings 20 of floor mat 8. Additionally, floor mat system 1, and particularly clips 10 thereof, allows floor mat 8 to be installed on any floor 4 with or without a recessed area 3. Also, the snap-fit engagement of projections 48 with latching shoulders 24 allow floor mat 8 to be removed from floor 4 to clean any dirt, debris or water which has accumulated within gap 56 and allow floor mat 8 to be easily snap-fit back onto clips 10 retaining floor mat 8 in a stationary position on floor 4.

Accordingly, the improved floor mat system is simplified, provides an effective, safe, inexpensive, and efficient device which achieves all the enumerated objectives, provides for eliminating difficulties encountered with prior art devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is byway of example, and the scope of the invention is not limited to the exact details shown or described.

Having now described the features, discoveries and principles of the invention, the manner in which the improved floor mat system is constructed and used, the characteristics of the construction, and the advantageous, new and useful results obtained; the new and useful structures, devices, elements, arrangements, parts and combinations, are set forth in the appended claims.

What is claimed is:

1. A floor mat system adapted to lie on the floor, comprising:
   a floor mat having a plurality of openings and at least one latching shoulder; the mat including a plurality of first parallel ribs and a plurality of second parallel ribs extending substantially perpendicularly to the first parallel ribs; the latching shoulder formed on at least one of the second parallel ribs;
   a clip adapted to be removably mounted on the floor;
   the floor mat removably secured to the clip in a manner that allows the floor mat to be removed from the clip simply by lifting the floor mat upwardly causing the floor mat to disengage the clip when the clip is secured to the floor; and
   said plurality of second parallel ribs including at least one middle rib disposed between latching ribs; said latching shoulder formed on at least one of said latching ribs.

2. The floor mat of claim 1, wherein the latching ribs support the first parallel ribs above the floor to form drainage channels between the latching ribs.

3. The floor mat of claim 2, wherein the latching ribs support the middle ribs above the floor; said clip being disposed between two of the latching ribs when the mat is secured to the clip.

4. The floor mat of claim 3, wherein there are at least two middle ribs disposed between each two latching ribs.

5. A floor mat system adapted to lie on the floor, comprising:
   a floor mat having a plurality of openings and at least one latching shoulder; the mat including a plurality of first parallel ribs and a plurality of second parallel ribs extending substantially perpendicularly to the first parallel ribs; the latching shoulder formed on at least one of the second parallel ribs;
   a clip adapted to be removably mounted on the floor;
   the floor mat removably secured to the clip in a manner that allows the floor mat to be removed from the clip simply by lifting the floor mat upwardly causing the floor mat to disengage the clip when the clip is secured to the floor; and
   each of the first and second ribs having an upper surface, the upper surface of the first ribs disposed above the upper surface of the second ribs.

6. The floor mat of claim 5, wherein the clip is disposed below the upper surfaces of the first and second ribs when the mat is secured to the clip.

7. A floor mat system adapted to lie on the floor, comprising:
   a floor mat having a plurality of openings and at least one latching shoulder;
   a clip adapted to be removably mounted on the floor;
   the floor mat removably secured to the clip in a manner that allows the floor mat to be removed from the clip simply by lifting the floor mat upwardly causing the floor mat to disengage the clip when the clip is secured to the floor;
   wherein there are at least two opposed latching shoulders on the floor mat, the clip having a pair of opposed projections that are disposed over the latching shoulders when the floor mat is secured to the clip;
   the latching shoulders being fabricated from a resilient material that deflects when the floor mat is lifted away from the clip to allow the latching shoulders to release the projections; and
   wherein there are two pairs of projections on the clip.

* * * * *